United States Patent [19]

King

[11] 4,292,713

[45] Oct. 6, 1981

[54] TOOL FOR APPLYING INSULATION TO PIPES

[75] Inventor: Clyde R. King, Joplin, Mo.

[73] Assignee: Eagle-Picher Industries, Inc., Cincinnati, Ohio

[21] Appl. No.: 75,257

[22] Filed: Sep. 13, 1979

[51] Int. Cl.³ .................... B65D 63/06; F16L 33/00
[52] U.S. Cl. .......................... 24/24; 29/157 R; 29/526 R; 24/258; 138/147
[58] Field of Search ............ 29/526 R, 455 R, 157 R; 24/24, 258; 138/147

[56] References Cited

U.S. PATENT DOCUMENTS

| | | | |
|---|---|---|---|
| 928,392 | 7/1909 | Markham | 24/24 |
| 2,504,881 | 4/1950 | Russell | 24/24 X |
| 2,956,325 | 10/1960 | Browne | 24/24 X |
| 3,703,190 | 11/1972 | Schoeffler | 24/24 X |
| 4,034,826 | 7/1977 | Andrews | 138/149 X |

FOREIGN PATENT DOCUMENTS 217799  10/1961  Austria .................................... 24/24

Primary Examiner—Charlie T. Moon
Attorney, Agent, or Firm—Wood, Herron & Evans

[57] ABSTRACT

Method and apparatus for applying insulation and a metal jacket to a pipe wherein insulation is first wrapped around the pipe and held by a clamp. A metallic jacket is then wrapped around the insulation and held by a clamp while the adjoining edges of the jacket are permanently secured together. The insulation and jacket respectively are temporarily held on the pipe by a clamping device which consists of a strap, a keeper at one end of the strap, a handle pivoted to the other end of the strap, the handle having a pivotal latch member which is engageable with the keeper.

3 Claims, 5 Drawing Figures

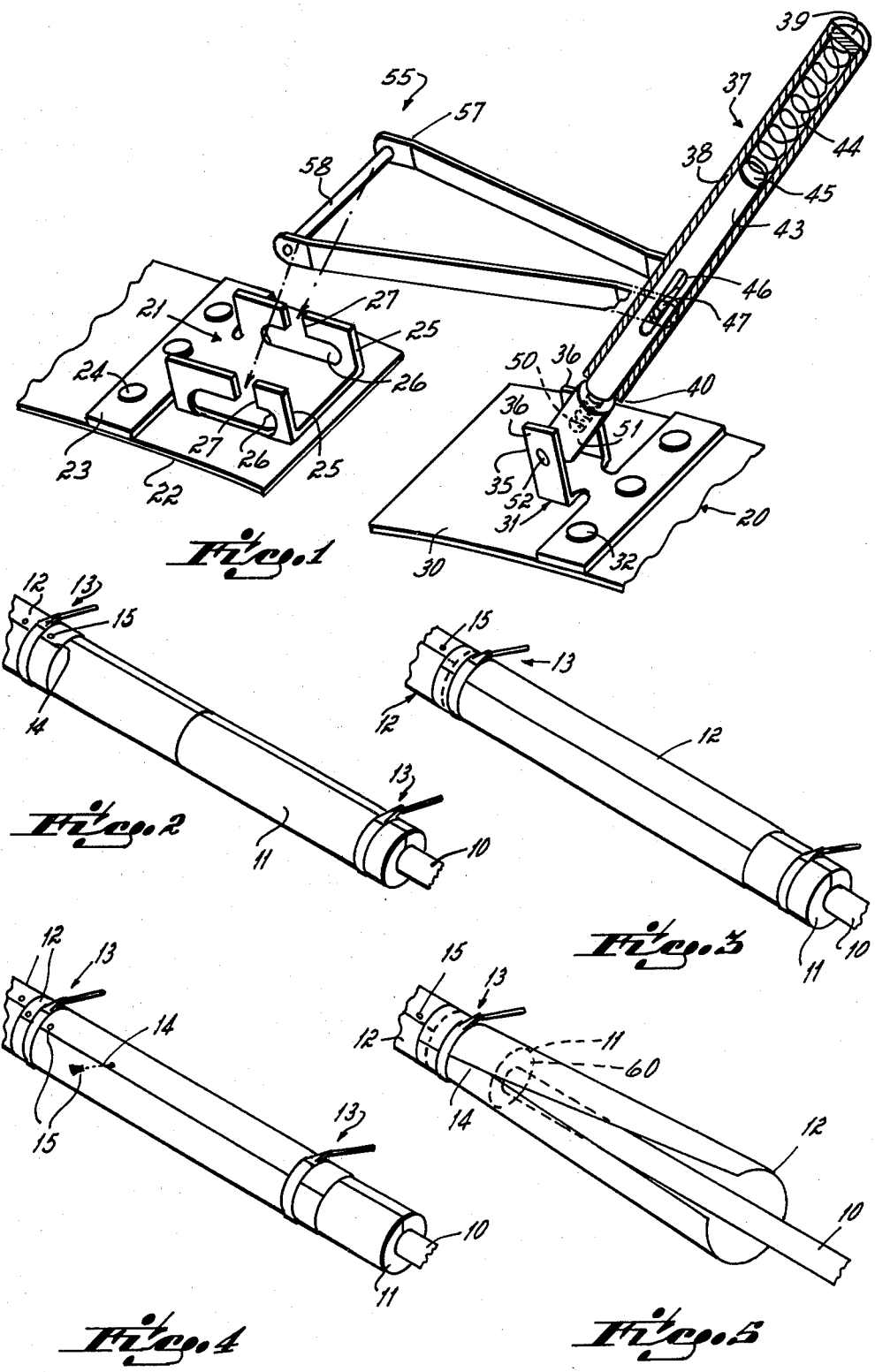

TOOL FOR APPLYING INSULATION TO PIPES

This invention relates to a method and apparatus for applying insulation to a pipe, and more particularly, the invention relates to a circumferential clamp and the manner in which it is temporarily applied to the insulation and to the jacket surrounding the insulation.

The insulation which is applied to pipes is in the nature of fibrous material either preformed in longitudinally-split sections or in flat, flexible batts of sufficient width to encompass the pipes. The insulation is of predetermined lengths and by nesting may be installed to virtually any thickness. Each insulation section is normally installed on a pipe and held there in some fashion as, for example, by wires, bands, or tape. A metallic jacket of aluminum, galvanized steel, or stainless steel is wrapped around the insulation and is also held with wires, bands, or tape. Pop rivets or self-tapping screws are sometimes used to secure the jacket at its overlapping edges. The sections of insulation and jacket are awkward to install and the insulation is difficult to compress uniformly for optimum insulative effect. Further, it is important to provide a resultant covering which is rugged to the extent that people can walk on it without unduly damaging it.

It has been an objective of the present invention to provide a tool and method of using it which will provide the tightest practical fit of the components, that is, insulation-to-pipe and jacket-to-insulation, and to achieve the maximum resistance to mechanical abuse and highest thermal and acoustical efficiencies.

The objective of the present invention has been attained by providing a tool or clamp including a strap adapted to wrap completely around the insulation and jacket, the strap having a keeper on one end and having a toggle-operated latch attached to the other end and cooperating with the keeper to reduce the diameter of the strap thereby squeezing the insulation and jacket radially inwardly.

Two tools may be operated in sequence in the following manner. Insulation is applied and held with one tool. A metallic jacket is then wrapped about the insulation and secured with another clamp. Then the clamp holding the insulation is slid upon the jacket to apply a second clamp to the jacket, thereby applying uniform clamping pressure along the length of the jacket. While the jacket is thus clamped in place, the overlapping edges of the jacket are secured together by fasteners such as self-tapping screws.

In another manner, the jacketing may be applied over a partially exposed insulation section projecting from a permanently fastened jacket section. One tool is used to clamp the new jacket section over the installed insulation causing the protruding end to flare somewhat. This flaring of the other end permits a new section of insulation to be slipped in to the flared end of the jacket and held there. In this continuous fashion, the insulation and jacket are applied to an indeterminate length of pipe with greater efficiency and a more uniform result than has heretofore been possible.

The several features and objectives of the invention will become more readily apparent from the following detailed description taken in conjunction with the accompanying drawings in which:

FIG. 1 is a fragmentary perspective view of the adjoining ends of a tool or the present invention;

FIGS. 2 through 5 are perspective views illustrating a sequence of steps which can be used in applying the insulation and jacketing to a pipe using the tool of FIG. 1.

Referring to FIG. 4, a pipe 10 as illustrated is surrounded by insulative material 11 and a jacket 12. The jacket 12 is surrounded by two clamping tools 13 of the present invention. The jacket 12 has overlapping edges 14 which are secured together by self-tapping screws 15 along approximately six inch centers.

The clamping tool includes a circumferential strap 20 of substantial width, for example two inches. The strap is of a length to clamp around a specific diameter of jacket as, for example, ten inches. Preferably, the strap is designed in relation to all the components so that when the jacket is finally applied and clamped to its final circumferential dimension, it will compress the insulation only approximately 1/16 of an inch. That amount of compression provides the desired thermal and acoustical efficiencies while achieving a satisfactory resistance to mechanical abuse.

The strap 20 has a keeper 21 secured to an end 22. The keeper has a flange 23 which is attached by rivets 24 to the end 22 of the strap. The keeper is generally U-shaped in cross section and has upstanding parallel spaced walls 25. The walls 25 have circumferentially extending slots 26 which are coextensive. The walls also have radial slots 27 which communicate with the circumferential slots but which are staggered with respect to each other.

The other end 30 of the strap 20 has a bracket 31 secured to it by rivets 32. The bracket includes a U-shaped element 35 having a pair of spaced upstanding parallel walls 36 to which a handle 37 is pivoted. The handle includes a tube 38 which is closed at its end 39 and is open at its end 40. A rod 43 is slidable in the tube 38 and is urged by a compression spring 44 toward the open end 40, the compression spring bearing against the closed end 39 and the inner end 45 of the rod. The rod has an elongated slot 46 which permits it to slide past a pin 47 as will be discussed below. The rod has an outer end 50 which is threaded into a collar 51, the collar in turn being pivoted on a pin 52 between the walls 36 of the bracket 31. The threaded connection is an optional feature which permits some adjustability of the compression stress which the clamp will apply to the jacket. The compression spring 44 assists in accommodating the clamping tool to out of tolerance insulation.

A latch 55 is mounted at one end on the pin 47 which passes through the slot 46 in the rod and a hole (not shown) in the tube 38. The other end 57 of the latch 55 carries a transverse pin or latch element 58 which is of a dimension which will permit it to pass through the radial slots 27 and lodge within the circumferential slots 26. Because the radial slots are circumferentially offset from one another, the latch must be angulated slightly in order to drop the transverse latch element 58 into the keeper through the slots 27, but once in place, the offset relationship of the radial slots prevents the latch from inadvertently escaping from the circumferential slots 26.

In the operation of the clamp, the band must be opened up sufficiently to slide it over a pipe which may be, for example, approximately six inches in diameter. Once the clamp has been slid over the pipe, it should not be necessary to totally remove it while a complete length of pipe is covered with insulation. The tool is oriented so that the keeper end 22 overlies the handle end 30 of the strap. By a slight twisting of the elements, the transverse latch element 58 is permitted to drop into the keeper slots. The handle is then swung from a generally radial position somewhat as shown in FIG. 1 to a tangential position as shown in FIGS. 2-5 to pull the keeper and, hence, the end 22 of the strap toward the end 30 of the strap, thereby reducing the circumference of the strap and compressing the insulation within the band. The pivot pin 52 of the handle 37 projects radially outwardly so as to provide an over-center toggle action to temporarily lock the handle and clamp in the clamped position.

One manner in which the clamp is used to apply the insulation is illustrated generally in FIGS. 2, 3 and 4. Since the insulation is in uniform sections which are abutting, and since the jacket sections are in uniform lengths which are slightly overlapping (about one and one-half inches), the relationship between the two components will continuously change requiring, from time to time, some variation in the sequence of operations, all well within the skill of the art.

As shown in FIG. 2, insulation 11 has been applied to the pipe 10 and is held at one end by the tool 13. A new section of jacket 12 is applied with the edges 14 overlapping and is clamped by the tool 13 adjacent the previously secured jacket. The tool 13 which was holding the insulation in position is then slid over onto the jacket as shown in FIG. 4 so that two tools are used to hold the jacket, thus applying uniform circumferential pressure to the jacket along its length. The jacket is then secured by applying self-tappin screws 15 to the overlapping edges 14 of the jacket.

As shown in FIG. 5, a new section of jacket may be applied to an exposed end 60 of the insulation. A first clamp is applied over the upstream end of the jacket which encircles the free end of the insulation. The application of that first clamp to the upstream end of the jacket over the free end of the insulation tends to flare open the opposite or downstream end. That flared open end permits a flesh section of insulation (not shown) to be wrapped around the pipe and slid into the flared opening of the jacket and to be temporarily held in position. Thereafter, the other clamp is applied to the jacket to clamp it down while the screws are applied to fasten it.

Thus, the sequence of steps goes on with only minor variations with the clamps holding sometimes the insulation and sometimes the jacket.

Having described my invention, I claim:

1. A tool for applying insulation to a pipe comprising,
    a strap,
    a keeper fixed to one end of said strap, said keeper including a receptacle to receive a latch,
    a handle pivoted at one end to the other end of said strap,
    said handle comprising,
        a tube closed at one end remote from the pivotal mounting of the handle on the strap,
        a compression spring in said tube adjacent the closed end thereof,
        and a rod slidable in said tube, said rod having an end pivoted to said strap,
    a latch pivoted at one end to said tube intermediate the ends of said tube, said latch having at its other end an element adapted to be received in said keeper,
    whereby said band may be applied to insulation or the jacket therefor, the latch inserted in said keeper, and the handle swung to lie generally tangential to said strap thereby clamping said band onto said insulation or jacket, said compression spring permitting said latch to accommodate various sizes of insulation.

2. A tool for applying insulation to a pipe comprising,
    a strap,
    a keeper fixed to one end of said strap, said keeper including a receptacle to receive a latch,
    a handle pivoted at one end to the other end of said strap,
    a latch pivoted at one end to said handle intermediate the ends of said handle, said latch having at its other end an element adapted to be received in said keeper,
    whereby said band may be applied to insulation or the jacket therefor, the latch inserted in said keeper, and the handle swung to lie generally tangential to said band thereby clamping said band onto said insulation or jacket,
    said keeper comprising,
        a U-shaped element having upstanding spaced parallel walls, each wall having a generally circumferentially-extending slot, and a radial slot communicating with the circumferential slot,
        said latch element consisting of a transverse rod adapted to pass through said radial slots to an operative position in said circumferential slots.

3. A tool as in claim 2 in which said radial slots are offset circumferentially from each other to improve retention of said transverse rod in said circumferential slots.

* * * * *